United States Patent
Gamage et al.

(10) Patent No.: US 11,589,261 B2
(45) Date of Patent: Feb. 21, 2023

(54) DEVICE AND/OR METHOD FOR RECONSTRUCTION OF SIGNAL PACKETS

(71) Applicant: Arm Limited, Cambridge (GB)

(72) Inventors: Sahan Sajeewa Hiniduma Udugama Gamage, Cambridge (GB); Parameshwarappa Anand Kumar Savanth, Cambridge (GB); Jedrzej Kufel, Littleport (GB); Mbou Eyole, Soham (GB)

(73) Assignee: Arm Limited, Cambridge (GB)

( * ) Notice: Subject to any disclaimer, the term of this patent is extended or adjusted under 35 U.S.C. 154(b) by 27 days.

(21) Appl. No.: 17/207,455

(22) Filed: Mar. 19, 2021

(65) Prior Publication Data

US 2022/0303828 A1    Sep. 22, 2022

(51) Int. Cl.
*H04W 28/06* (2009.01)
*H04W 52/02* (2009.01)

(52) U.S. Cl.
CPC ......... *H04W 28/065* (2013.01); *H04W 52/02* (2013.01)

(58) Field of Classification Search
None
See application file for complete search history.

(56) References Cited

U.S. PATENT DOCUMENTS

| 5,542,116 A | * | 7/1996 | Schellinger | ....... H04W 52/0216 455/343.3 |
| 2004/0158750 A1 | * | 8/2004 | Syed | ...................... G06F 1/3287 713/320 |
| 2017/0187635 A1 | * | 6/2017 | Subasingha | ............. H04L 43/16 |
| 2017/0195964 A1 | * | 7/2017 | Smaini | .............. H04W 52/0235 |

OTHER PUBLICATIONS

Hester, et al, "New Directions: The Future of Sensing is Batteryless, Intermittent, and Awesome," In Proceedings of SenSys '17, Nov. 6-8, 2017, DOI: 10.1145/3131672.3131699, 6 pages.
Wikipedia, "Wireless identification and sensing platform," https://en.wikipedia.org/wiki/Wireless_identification_and_sensing_platform, Downloaded Sep. 13, 2022, 2 Pages.
GS1, "The Global Language of Business, :EPC Tag Data Standard," Release 1.13, Ratified, Nov. 2019, 217 Pages.
Wikipedia, "IP fragmentation," https://en.wikipedia.org/wiki/IP_fragmentation, Downloaded Sep. 13, 2022, 4 Pages.

* cited by examiner

*Primary Examiner* — Lonnie V Sweet
(74) *Attorney, Agent, or Firm* — Berkeley Law & Technology Group, LLP

(57) ABSTRACT

Subject matter disclosed herein may relate to reconstructing wireless signal packets and may relate more particularly to reconstructing wireless signal packets from iterations of the wireless signal packets repeatedly transmitted by a transmitter device.

16 Claims, 13 Drawing Sheets

DEVICE AND/OR METHOD FOR RECONSTRUCTION OF SIGNAL PACKETS

BACKGROUND

Field:

Subject matter disclosed herein may relate to reconstructing wireless signal packets and may relate more particularly to reconstructing wireless signal packets from iterations of the wireless signal packets repeatedly transmitted by a transmitter device.

Information:

Evolution of the so-called Internet-of-Things (IoT) is expected to deploy trillions of devices including battery-less devices such as, for example, radio frequency identification (RFID) tags, battery-less sensors and/or the like. In a particular implementation, processing circuits of such a battery-less device may be powered, at least in part, by radio frequency (RF) energy, light energy or acoustical energy and/or the like transmitted by devices in a close proximity and collected at the battery-less device.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

Figure 1A:
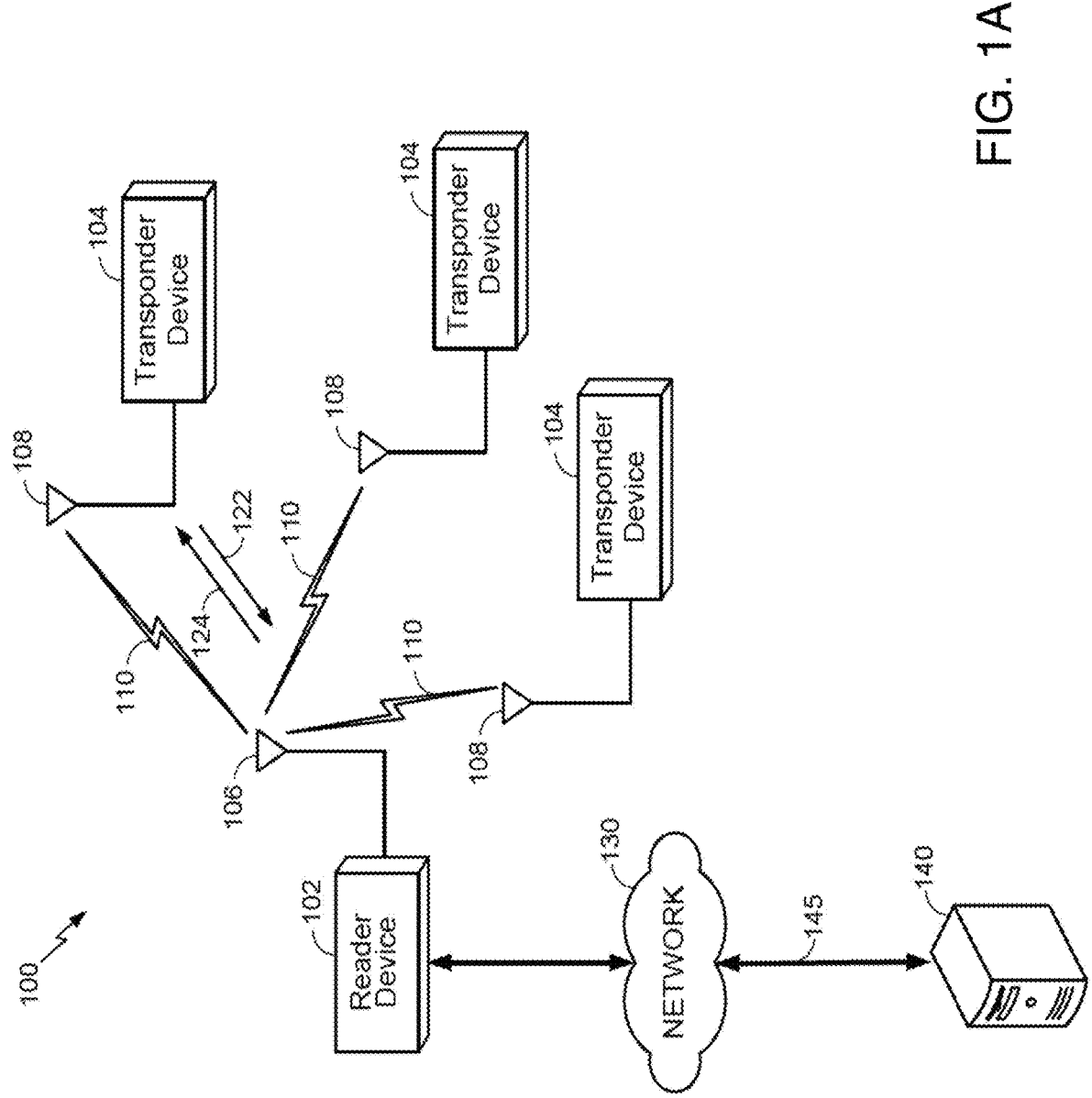
FIG. 1A is a system diagram illustrating certain features of a system containing one or more transponder devices, in accordance with an implementation.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

According to an embodiment, radio frequency identification (RFID) schemes may enable asymmetric communications between reader devices and very inexpensive, battery-less RFID tag devices and/or the like. In an implementation, a battery-less RFID tag device may collect and/or harvest and reflect RF energy and/or power emitted from such reader devices. While some battery-less RFID tag devices may merely provide a signal that indicates an identity of an object associated with and/or co-located with such battery-less RFID tag device, more advanced battery-less RFID tag devices may additionally have processing functionality. For example, some battery-less RFID tag devices may comprise more complete Computational-RFID (C-RFID) tag devices and/or the like having advanced embedded processing capabilities while operating within particular power and/or cost constraints. Additionally, some battery-less RFID tag devices with advanced processing capabilities may be capable of operating with intermittent collectable incoming power, relying on lower power embedded non-volatile memory technologies such as magnetic random access memory (MRAM) and/or correlated electron random access memory (CeRAM) technologies, for example.

FIG. 1A is a schematic diagram illustrating certain features of a system 100 containing one or more computeenabled transponder devices 104, in accordance with an implementation. In the currently illustrated embodiment, a reader device 102 may transmit a radio frequency (RF) signal 110 to one or more transponder devices 104 wherein energy of RF signal 110 harvested and/or collected at an antenna 108 may be used to power one or more capabilities of such a transponder device 104. In some embodiments, a transponder device 104 may reflect and/or backscatter a portion of RF signal 110 back to reader 102 and modulate the reflected and/or backscattered portion of RF signal 110 by detectable symbols and/or parameters (e.g., an identifier of an object associated with and/or co-located with a transponder device 104). Additionally, a transponder device 104 may harvest and/or collect energy received from RF signal 110 for use in powering one or more subsystems of transponder device 104 (e.g., one or more processors, memory, sensors, transceiver devices, display devices, etc., not shown). For example, in addition to having an antenna 108, a transponder device 104 may comprise resonating circuitry and/or structures, charge storage devices (e.g., capacitors) and/or the like to harvest and/or collect energy from a portion of RF signal 110 received at antenna 108. Operating without a chemical battery power source, a transponder device 104 may from time-to-time harvest and/or collect energy of RF signal 110 to, for example, power embedded processing capabilities such as embedded processing capabilities of a CRFID tag. In a particular implementation, reader 102 may transmit RF signal 110 to multiple (e.g., up to 100 or more) transponder devices 104 to, for example, provide power that is harvestable and/or collectable at antenna 108.

In an embodiment, reader device 102 and a transponder device 104 may communicate bidirectionally in that reader device 102 may transmit messages to transponder devices 104 in a downlink signal (e.g., RF signal 110) and transponder devices 104 may transmit messages to reader device 102 in an uplink signal 122. In one example, uplink signal 122 may comprise, for example, a signal indicating and/or expressing an identifier of a corresponding transponder device 104 and/or object co-located with such a corresponding transponder device 104. In an embodiment, uplink signal 122 may comprise a reflection of RF signal 110 that has been modulated with parameters and/or symbols to be detected and/or recovered at reader device 102. In one embodiment, downlink signal 124 may at least in part comprise a modulation of RF signal 110 control signals. In particular implementations, a reader device 102 and a transponder device 104 may exchange messages in a downlink signal 124 and an uplink signal 122 according to one or more signal messaging formats set forth in one or more ISO/IEC 18000 conventions.

In other examples in which a transponder device 104 comprises more advanced sensing and/or processing capabilities (e.g., as a CRFID tag), uplink signal 122 may comprise more robust messaging such as, for example, sensor measurements and/or values computed based, at least in part, on sensor measurements.

In an embodiment, reader device 102 may transmit RF signal 110 at an RF signal power level of about one to two watts and/or may comprise a low voltage and/or battery operated device operating within a limited power budget such as, for example, ten watts. In addition to powering a transceiver device (not shown) to transmit RF signal 110 and/or to process received signals transmitted from transponder devices 104, reader device 102 may comprise a single board computer hosting a real-time operating system (e.g., Linux) to enable, for example, Internet access (e.g., via network 130) and/or to perform device management.

In some implementations, reader device 102 may be installed in a warehouse or retail environment such that reader device 102 may remain powered continuously to service a dense deployment of transponder devices 104. In an alternative implementation in which up to a trillion transponder devices 104 may be more sparsely deployed (e.g., over homes, hospitals, metropolitan areas, etc.), a locally deployed individual reader device 102 may service a smaller local deployment of devices, and may not be continuously powered (e.g., periodically powered up and powered down) to conserve energy.

According to an embodiment, an intensity of collectable and/or harvestable power received at an antenna 108 of a transponder device 104 from transmission of RF signal 110 may be determined based, at least in part, on a power level at which reader device 102 transmits RF signal 110 and other factors including, for example, a range and/or distance between reader device 102 and such a transponder device 104, deviations from line-of-sight transmissions, presence of multi-path, presence of RF shadows from other transponder devices 104, just to provide a few examples of such additional factors. In a particular implementation, reader device 102 may not be aware of such additional factors and also may not be aware an amount of collectable energy and/or power that would be sufficient to power functions (e.g., computing, sensing, processing sensor signals and/or message/signal transmission) of such a transponder device 104. On the other hand, a transponder device 104 may be capable of measuring collectable and/or harvestable power received from RF signal 110 and determining collectable energy and/or power sufficient to power functions of such a transponder device 104.

In the particular implementation of FIG. 1A, for simplicity of illustration system 100 includes multiple transponder devices 104 to receive an RF signal 110 from a single reader device 102. It should be understood that in other implementations, such as system 101 of FIG. 1B, a transponder 104 may communicate with and/or receive an RF signal from (e.g., to provide harvestable and/or collectable power) multiple different reader devices 102. Additionally, as shown in system 101, a transponder device 104 may receive an RF signal from one or more power beacon devices 103 that are dedicated to providing a harvestable and/or collectable power from an RF signal (e.g., without uplink and downlink messaging).

Figure 1B:
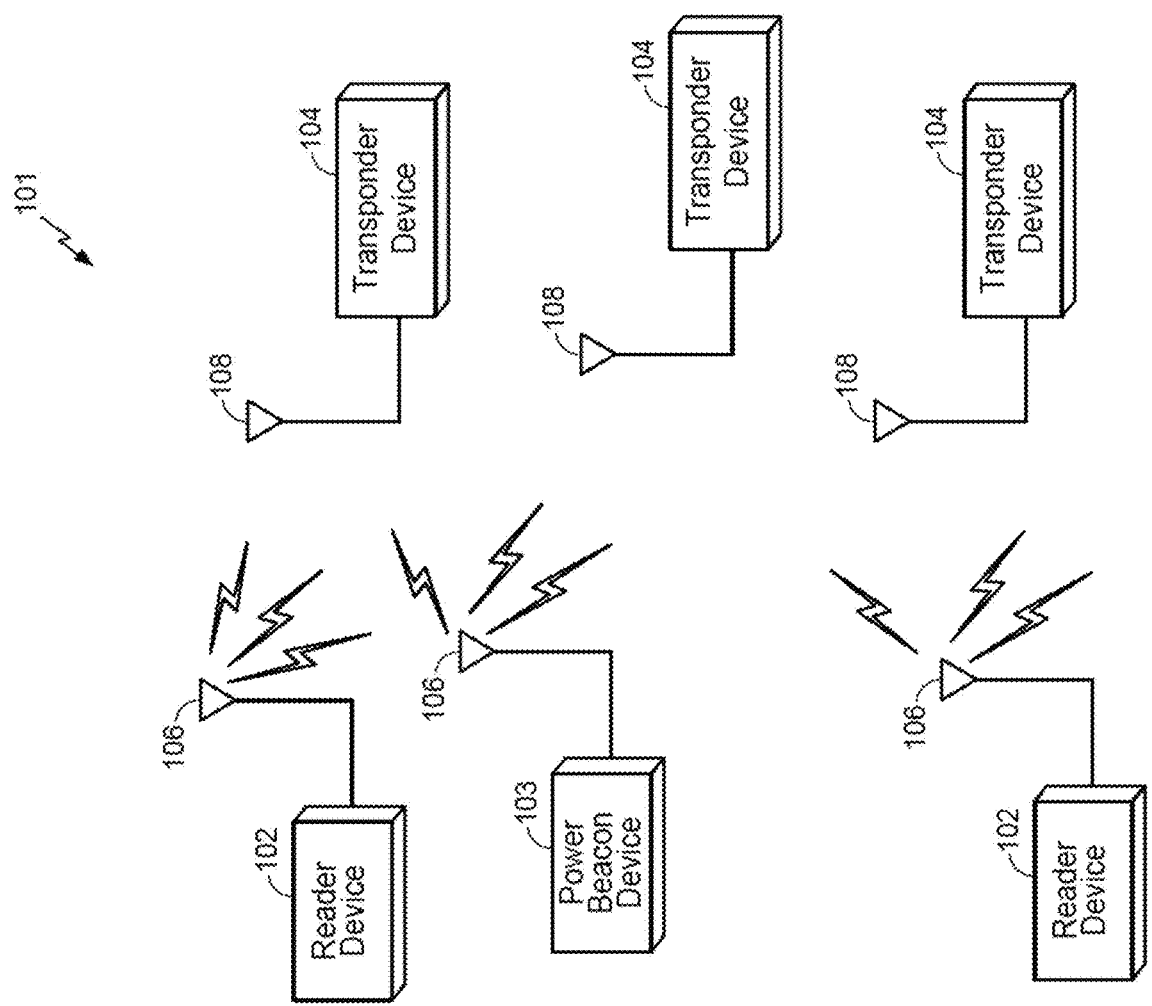
FIG. 1B is a system diagram illustrating certain features of a system containing one or more transponder devices, in accordance with an alternative implementation.

While particular example implementations discussed with reference to FIGS. 1A and 1B are directed to use of an RF signal to provide collectable and/or harvestable power and/or energy to a transponder device, it should be understood that an RF signal is merely an example power signal, that embodiments described herein may applicable to use of different types of signals to deliver incident power, and claimed subject matter is not limited in this respect. For example, a power signal may comprise, for example, collectable and/or harvestable signal power and/or energy in the form of an RF power signal, light power signal (e.g., IR) and/or acoustical power signal, just to provide a few examples.

Herein, "transponder," "transponder device," "tag," "tag device," "receiver," "receiver device" and/or the like refer to a device having capabilities to harvest RF energy, to receive wireless signal packets and to acknowledge receipt of wireless signal packets. Herein, "transponder," "transponder device," "tag," "tag device," "receiver," "receiver device" and/or the like may be used interchangeably. Further, "transmitter," "transmitter device," "reader," "reader device" and/or the like may be utilized interchangeably herein. "Transmitter," "transmitter device," "reader," "reader device" and/or the like refer to devices having a capability to transmit wireless signal packets and/or to obtain acknowledgment of receipt of wireless signal packets from receiver devices.

As mentioned, evolution of the so-called Internet-of-Things (IoT) is expected to deploy trillions of devices including battery-less devices such as, for example, C-RFID tags, battery-less sensors and/or the like. Proliferation of C-RFID devices, including C-RFID systems-on-a-chip (SoC), may be made significantly easier if C-RFID tags and/or the like remain substantially compliant and/or compatible with existing protocols and/or standards, for example. However, in some circumstances, some tag device designs may experience difficulties processing relatively lengthy wireless signal packets (e.g., over-the-air firmware updates) utilizing some protocols due to relatively frequent power loss at the tag device. Some features mandated by some protocols and/or standards, such as strict-half-duplex, listen-before-talk, reader-talks-first, etc., may limit the functional range of C-RFID tag devices, for example.

Figure 2A:
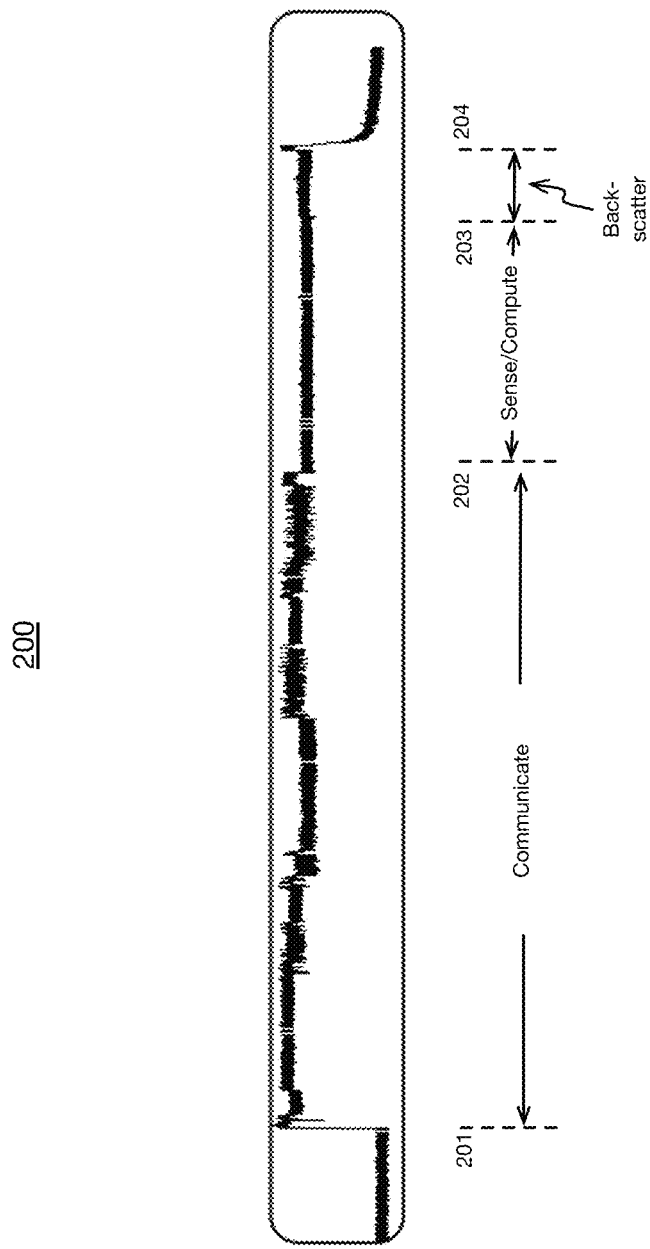
FIG. 2A is a diagram illustrating features of a pulse of a power signal provided by a reader device including a backscatter period according to an embodiment.

FIG. 2A is a diagram illustrating features of a measured waveform 200 depicting harvested voltage at a receiver device (e.g., transponder 104). In a particular implementation, a transmitter device (e.g., reader device 102) may transmit a wireless signal packet waveform at a particular transmission power, pulse duration, duty cycle, pulse period and/or pulse repetition frequency. As mentioned, an incident power signal may enable a receiver device to power one or more subsystems from signal energy collected and/or harvested from an incident power signal. Such subsystems may comprise devices of a receiver device such as, for example, sensors, circuitry for conditioning sensor signals, analog-to-digital circuitry for sampling conditioned sensor signals, processors and non-volatile memory for processing sensor signals and performing related computations, RF circuitry for transmitting and receiving messages, just to provide a few examples of subsystems at a receiver device that may be powered from power and/or energy collected and/or harvested from a received incident power signal.

According to an embodiment, and as shown in FIG. 2A, different actions may be performed by a receiver device (e.g., transponder device 104) receiving a wireless signal packet waveform over a duration of example waveform 200 depicting harvested voltage at the receiver device. Over an initial portion of waveform 200 (e.g., beginning at point in time 201 and ending at point in time 202) a receiver device may process (e.g., detect, demodulate and/or decode) one or more messages (e.g., as specially formatted signal packets) over a "communicate" portion of waveform 200 from a transmitter device. Such a "communicate" portion of waveform 200 may at least in part implement a downlink signal (e.g., downlink signal 124, FIG. 1A). Over a duration of example waveform 200, the receiver device may collect and/or harvest power and/or energy to be used in powering one or more functions to be performed at the receiver device. For instance, as shown in FIG. 2A such collected and/or harvested power and/or energy may power sensing, computing and/or backscattering functions, just to provide a few examples.

As shown in FIG. 2A, during a "sensor acquisition" portion (e.g., between points in time 202 and 203) a receiver device (e.g., transponder device 104) may collect observations, samples and/or measurements based on one or more signals generated by one or more sensors (e.g., atmospheric pressure sensor, humidity sensor, light sensor and/or temperature sensor) at a receiver device collecting and/or harvesting power and/or energy from waveform 200. During a "compute" portion of waveform 200, a receiver device may perform one or more computations such as, for example, computations to process samples, observations and/or measurements based on sensor signals obtained during a "sensor acquisition" portion. Such computations may comprise, for example, a statistical analysis of observations and/or measurements based on sensor signals (e.g., mean, standard deviation and/or computation quality metrics). As shown in FIG. 2A, sensor acquisition and compute portions may overlap over a portion of waveform 200 (e.g., between points in time 202 and 203). Also, FIG. 2A shows a "backscatter" period (e.g., beginning at point in time 203 and ending at point in time 204) that follows a compute portion in waveform 200 in which a receiver device may modulate a reflected signal based, at least part, on a message to be transmitted back to a transmitter device. Such a message modulating a reflected signal may comprise a specially formatted signal packet to contain computing results determined and/or obtained during the "compute" period. In an embodiment, such a backscatter period may comprise an implementation of an uplink signal (e.g. uplink signal 122, FIG. 1A).

Figure 2B:
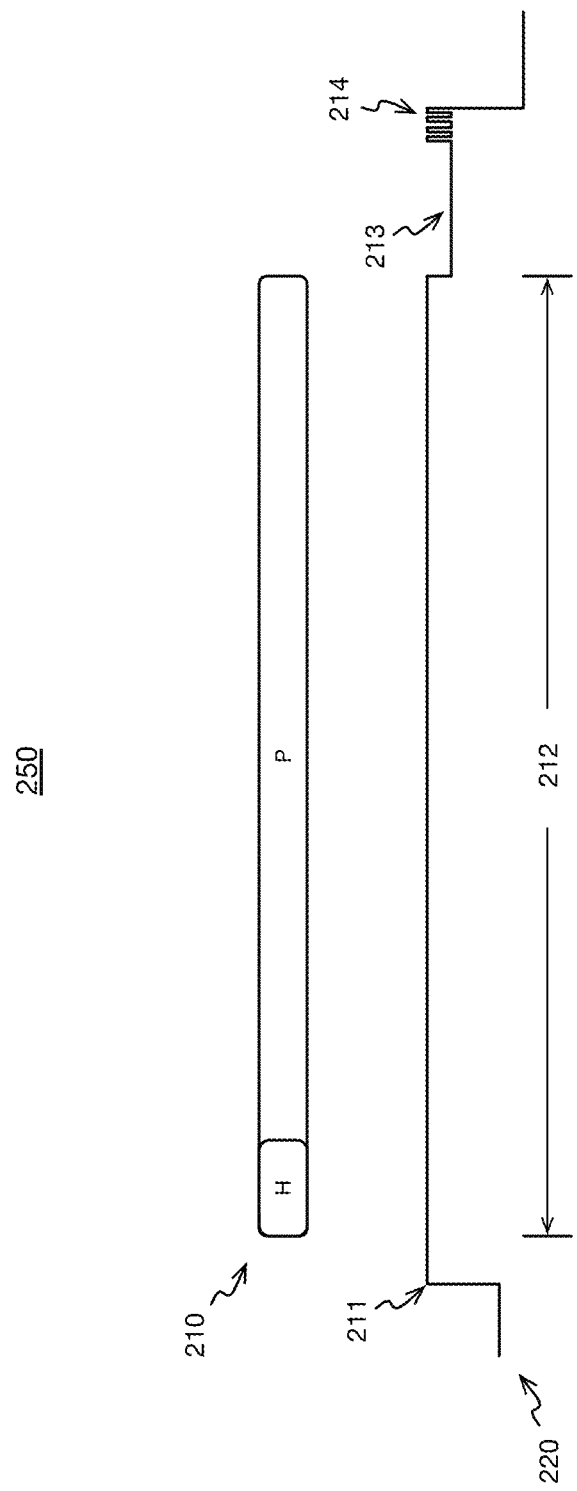
FIG. 2B is a diagram depicting an illustration of a wireless signal packet and a power signal at a receiver device.

FIG. 2B is a diagram depicting an illustration of a wireless signal packet 250 transmitted by a transmitter device (e.g., reader device 102) and an incident power signal 220 at a receiver device (e.g., transponder device 104). For the present example, power signal 220 corresponds, at least in part, to example waveform 200 depicted in FIG. 2A. For power signal 220, a communicate period 212 is depicted, similar in at least some respects to the communicate period depicted in FIG. 2A. A sense/compute period 213 is also depicted, as is a backscatter period 214. Further, power signal 220 may represent an abstraction of example waveform 200. FIG. 2B further depicts a temporal correlation between wireless signal packet 210 and power signal 220 at a receiver device.

For the example implementation depicted in FIG. 2B, a receiver device may transition a power state of the receiver device from a reduced power state to an elevated power state, as indicated at edge 211 of example power signal 220. In some circumstances, a receiver device may enter an elevated power state in order to process a wireless signal packet, such as example packet 210. Further, in some circumstances, an entire wireless signal packet, such as packet 210, may be received during a single transmission of the wireless signal packet from a transmitter device. However, as discussed previously, some circumstances may not permit receipt and/or processing of a complete and/or unfragmented wireless signal packet during a single transmission of the wireless signal packet.

For example, as mentioned, an amount of incident collectable and/or harvestable RF power and/or energy received at a receiver device (e.g., transponder device 104) may be reduced to a level that does not enable fully powering functions (e.g., sensing, computing and/or signal transmission functions) to an extent desired. In some circumstances, a reduction in available RF power and/or energy may result from range and/or distance between a transmitter device (e.g., reader device 102) and a receiver device (e.g., transponder device 104), deviations from line-of-sight transmissions, reflections, scattering, multi-path fading, etc. In some circumstances, reductions in the availability of incident collectable and/or harvestable RF power and/or energy may result in brown-out conditions at a receiver device. In such circumstances, communication between a transmitter device and a receiver device may fail if a complete wireless signal packet has not been received and/or acknowledged by the transponder device before the amount of available power and/or energy falls below a threshold level, for example.

Figure 3:
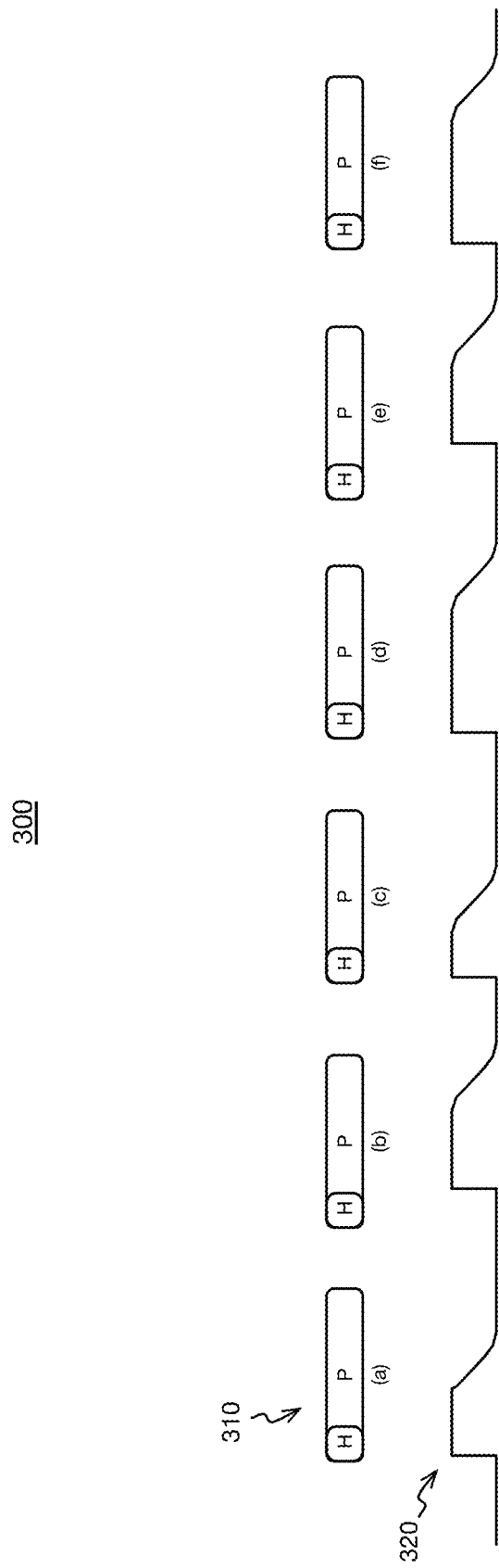
FIG. 3 is a diagram illustrating multiple iterations of a wireless signal packet.

For example, FIG. 3 depicts multiple iterations 300 of a particular wireless signal packet 310 and further depicts an incident power signal 320 received at a receiver device. As depicted in FIG. 3, in some circumstances, a transmitter device may repeatedly transmit a number of iterations (e.g., iterations "a" through "f" with a repeated/identical downlink message) of a particular wireless signal packet, such as wireless signal packet 310, in an effort to ensure successful communication of the particular wireless signal packet to a receiver device. However, as depicted in FIG. 3, unless sufficient RF energy and/or power is available at the transponder device to process the received particular wireless signal packet in its entirety, further communication failures may occur. In FIG. 3, there may not exist sufficient RF energy and/or power to complete a successful communication of wireless signal packet 310. Each iteration of wireless signal packet 310 has periods of time during processing of wireless signal packet 310 at a receiver device in which insufficient RF energy and/or power is available to completely process wireless signal packet 310 (e.g., detect, demodulate and/or decode wireless signal packet 310). For example, as depicted for power signal 320, various non-idealities created by reflections, scattering, multi-path fading, etc., for example, may lead to early brown-out (e.g., see iterations (a)-(f)) and/or delayed on-time (e.g., see iterations (b) and (e)).

As an illustration, for iteration (a) of wireless signal packet 310, RF power and/or energy signal 320 shows an initial elevation of power (e.g., receiver device entering an elevated power state) and a period of time wherein sufficient energy is available to process (e.g., detect, demodulate and/or decode) a portion of wireless signal packet 310 followed by a brown-out condition and/or the receiver device returning to a reduced power state. For iteration (a), communication of wireless signal packet 310 is unsuccessful. For iteration (b), sufficient power is not available until after signal packet header (H) has already been transmitted (i.e., delayed on-time). Thus, for this particular example, communication of iteration (b) is unsuccessful. Similar circumstances for the example depicted in FIG. 3 are shown for iterations (c), (d), (e) and (f). Thus, even for circumstances in which a transmitter device performs repeated transmission of a wireless signal packet, successful communication of the wireless signal packet may not be ensured. Such types of communications failures may be exacerbated as receiver devices continue to be designed for longer range operation and/or with relatively more aggressive power budgets.

Embodiments and/or implementations described herein seek to address the challenges identified above by, for example, transitioning a receiver device to a lower-power state mid-packet reception so as to conserve energy and/or to incrementally reconstruct a particular wireless signal packet over repeated transmission of multiple iterations of the particular wireless signal packet (e.g., multiple re-transmissions of a particular wireless signal packet) each over different power cycles, as explained more fully below.

Figure 4:
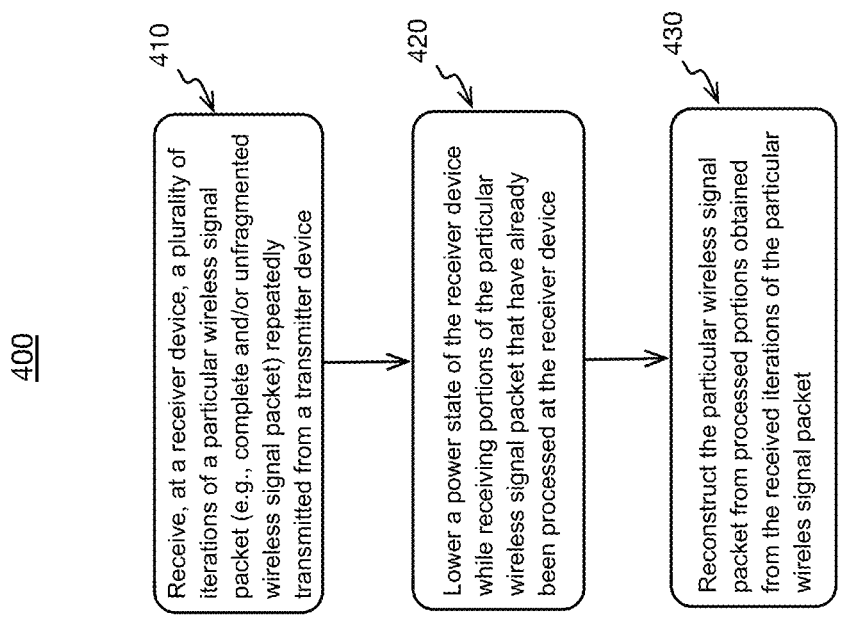
FIG. 4 is a flow diagram of a process for processing multiple iterations of a wireless signal packet at a receiver device, in accordance with an implementation.

FIG. 4 is a flow diagram of an embodiment 400 of a process for processing multiple iterations of a wireless signal packet at a receiver device. Example process 400 may address, at least in part, the aforementioned challenges arising from reductions in availability of incident collectable and/or harvestable RF power and/or energy at a receiver device (e.g., tag device, transponder device, etc.). In a particular implementation, process 400 may be performed, in whole or in part, by a receiver device (e.g., transponder device 104). Further, it should be noted that content acquired or produced, such as, for example, input signals, output signals, operations, results, etc. associated with example process 400 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

For example process 400, as depicted at block 410, a receiver device (e.g., transponder 104) may receive multiple iterations of a particular wireless signal packet repeatedly transmitted by a transmitter device (e.g., reader device 102), in an implementation. In an implementation, a particular wireless signal packet may comprise a complete and/or unfragmented wireless signal packet. Further, as depicted at block 420, a receiver device may reduce its power state while receiving portions of a particular wireless signal packet that have already been processed (e.g., detected, demodulated and/or decoded to recover a portion of a message in the particular wireless signal packet) at the receiver device, for example, thereby conserving RF power and/or energy. Also, in an implementation, a receiver device may reconstruct a particular wireless signal packet (e.g., complete and/or unfragmented wireless signal packet) from processed portions obtained from received iterations of a particular wireless signal packet, as depicted at block 430. This may, for example, enable such a receiver device to flexibly tailor and/or optimize its operational effectiveness during periods of reduced availability of RF power and/or energy. It should be noted that although examples provided herein discuss particular wireless signal packets (e.g., complete and/or unfragmented wireless signal packet) transmitted by a transmitter device received at a receiver device, transmission/receipt of such wireless signal packets may be interleaved with transmission/receipt of other wireless signal packets.

For an estimate of a particular implementation in a wireless internet service provider-type system including tag devices utilizing magnetic random access memory (MRAM) for non-volatile (NV) memory, for example, power consumption for an elevated power state for a particular tag device may be approximately 2.12 µW. Also, in an implementation, for mid-packet reduced/lower power state with an active analog front end (AFE) and an active protocol implementation circuit (e.g., UHF Gen2 Air Interface Protocol, v2.1), a tag device may be estimated to consume 0.91 µW, for example. Further, in an implementation, for mid-packet reduced/lower power state with AFE turned off, for example, a tag device may be estimated to consume 0.1 µW, for example. In particular implementations, a sleep duration of 6 ms (e.g., one query transaction with transmission link-frequency at 250 kHz and zero responses from a receiver device, such as transponder device 104) may translate to 12 nJ, for example. For an implementation of a tag device and/or the like with an active AFE or with AFE turned off, enough energy for the same 6 ms may be available to recover 540 bits of a portion of a wireless signal packet to be written to NV memory (e.g., at 12 pJ per bit write energy), for example. Example process 400 may be more fully understood in light of example implementations described below in connection with FIGS. 5-10, although embodiments and/or implementations are not limited in scope to the particular examples provided.

Figure 5:
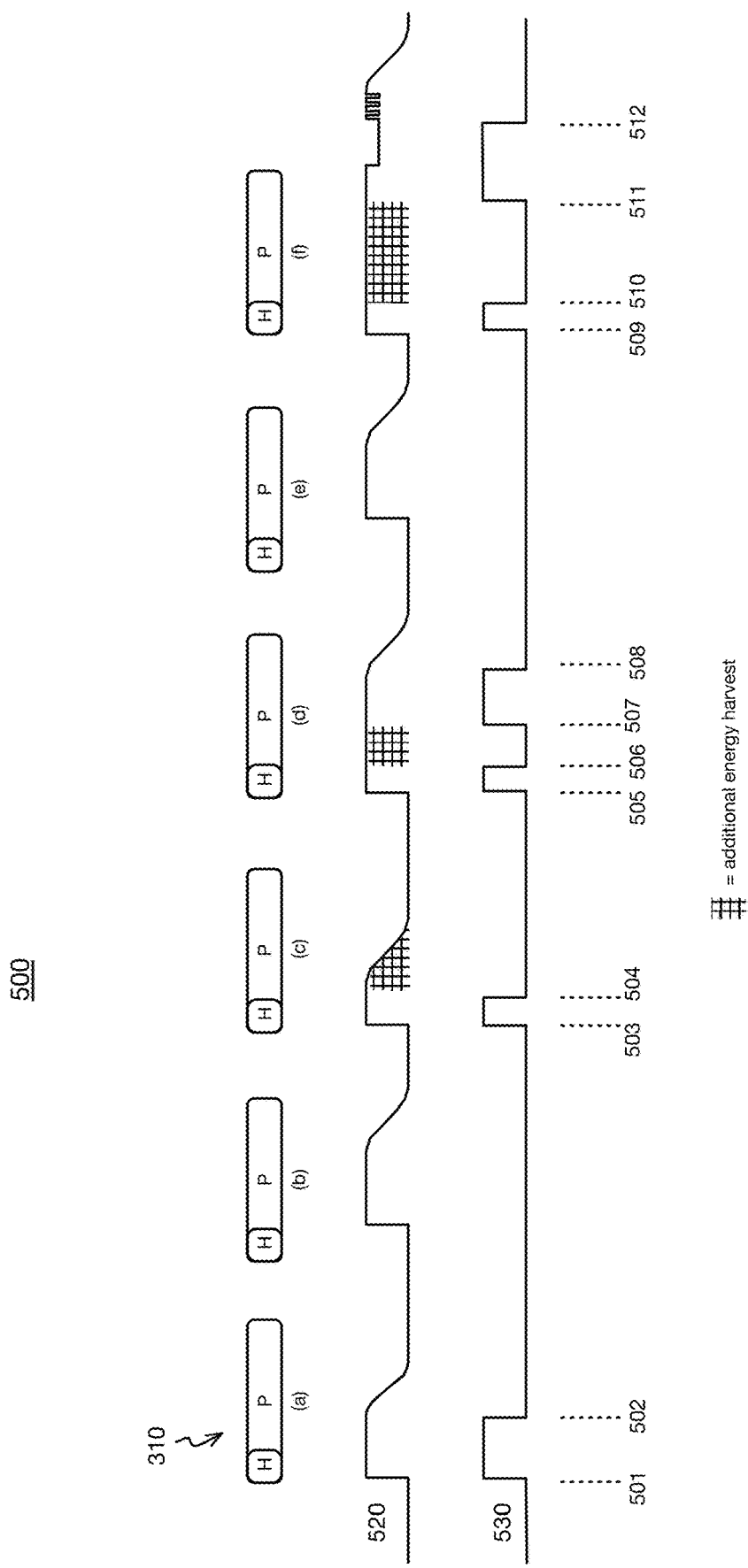
FIG. 5 is a diagram illustrating a process for processing multiple iterations of a wireless signal packet at a receiver device, in accordance with an implementation.

FIG. 5 is a diagram illustrating a process 500 for processing multiple iterations of a particular wireless signal packet, such as wireless signal packet 310, at a receiver device, such as transponder device 104, for example, in accordance with an implementation. For the example depicted in FIG. 5, waveform 520 may depict an RF power and/or energy signal measured a receiver device. Further, for example, waveform 530 illustrates lower and higher power states for the receiver device. As utilized herein, "higher," "elevated" and/or the like in connection with power states for a receiver device may be utilized interchangeably. Further, "lower," "reduced" and/or the like in connection with power states for a receiver device may be utilized interchangeably.

For a first iteration (i.e., iteration (a)) of wireless signal packet 310 (e.g., complete and/or unfragmented wireless signal packet) transmitted by a transmitter device (e.g., reader device 102), a receiver device (e.g., transponder device 104) may enter a higher power state at point in time 501 and between point in time 501 and point in time 502 may receive a header (H) and a portion of the packet (P) of wireless signal packet 310 before a brown-out due to a fading power and/or energy level, for example. In an implementation, for a second iteration (i.e., iteration (b)), the transmission may be lost due to delayed turn-on, causing the receiver device to miss the header. Note that during iteration (b) the receiver device stays in a reduced power state, as indicated by power state waveform 530, for example.

For iteration (c), a receiver device may enter an elevated power state at point in time 503 and may detect header H, for example. In an implementation, a receiver device may reduce its power state at point in time 504 for the portion of wireless signal packet 310 that has been previously received and/or processed (i.e., at iteration (a)). However, for example iteration (c), a brown-out may occur before processing additional portions of wireless signal packet 310 that have not been previously processed. Note that additional power and/or energy harvesting may occur during the time period following entering the lower power state at point in time 504 and the brown-out condition, for example.

At a fourth iteration (i.e., iteration (d)), for example, a receiver device may enter an elevated power state at point in time 505 and may detect header H. In an implementation, because the receiver device has already processed (e.g., detected, demodulated and/or decoded) an earlier portion of wireless signal packet 310 during iteration (a), the receiver device may enter a reduced power state at point in time 506 in order to conserve and/or harvest power and/or energy. Further, at point in time 507, additional portions of wireless signal packet 310 that have not been previously processed may become available and the receiver device may re-enter a higher power state, for example. In an implementation, between points in time 507 and 508 additional portions of wireless signal packet 310 may be processed until a brown-out condition may prevent further processing. The receiver device for the present example may enter a reduced power state at point in time 508 and may remain in a reduced power state until a subsequent header H is detected during iteration (f) (during iteration (e) the header is missed), for example. In an implementation, due at least in part to the receiver device having already processed previous portions of wireless signal packet 310 during iterations (a) and (d), for example, the receiver device may enter a reduced power state at point in time 510 in order to conserve and/or harvest power and/or energy.

Further, for example, at point in time 511 additional portions of wireless signal packet 310 that have not been previously processed may become available and the receiver device may re-enter an elevated power state. In an implementation, between points in time 511 and 512 additional portions of wireless signal packet 310 may be processed until a complete wireless signal packet 310 has been processed and can be reconstructed. Note that an elongated period for processing portions of wireless signal packet 310 during iteration (f) may be made possible due at least in part to power and/or energy conservation and/or power and/or energy harvesting during a reduced power state of the receiver device between points in time 510 and 511, in an implementation. Also, energy conserved and/or harvested mid-packet (e.g., between points in time 510 and 511) may allow a receiver device to perform sense and/or compute operations and/or may acknowledge completion of communication of wireless signal packet 310 via back-scatter, for example. Of course, as mentioned, a back-scatter operation may also communication other types of content, such as sensor parameters, computational output, etc. In an implementation, a communication transaction between transmitter device (e.g., reader device 102) and receiver device (e.g., transponder 104) such as to communicate wireless signal packet 310 may time-out after a specified period of time and/or after a specified number of iterations of re-transmission if transmission has not been successfully completed prior to the time-out condition.

As mentioned, although examples provided herein describe particular wireless signal packets (e.g., complete and/or unfragmented wireless signal packet) transmitted by a transmitter device received at a receiver device, transmission/receipt of such wireless signal packets may be interleaved with transmission/receipt of other wireless signal packets. For example, iterations (a) through (f) of particular wireless signal packet 310 depicted in FIG. 5 may be interleaved with any number of other signal packets.

Figure 6:
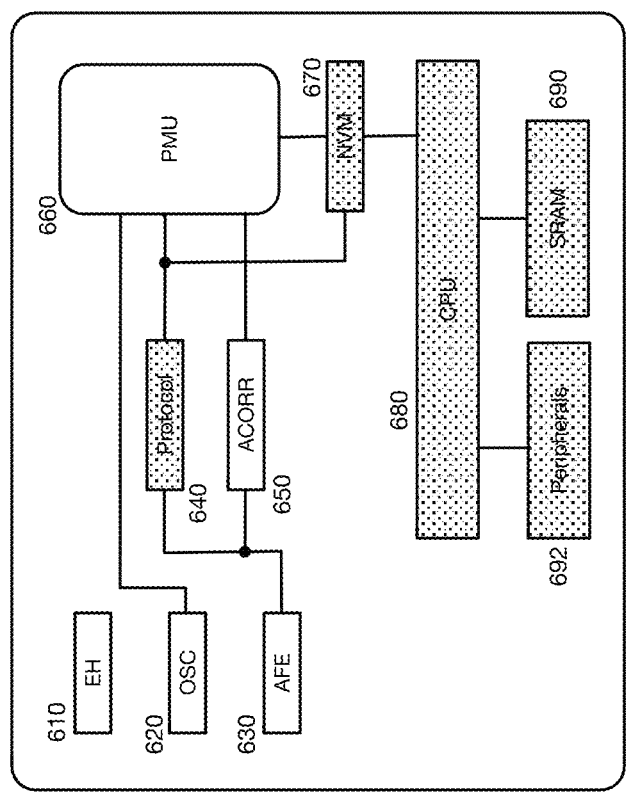
FIG. 6 is a block diagram illustrating an example receiver device, in accordance with particular implementations.
Figure 6:
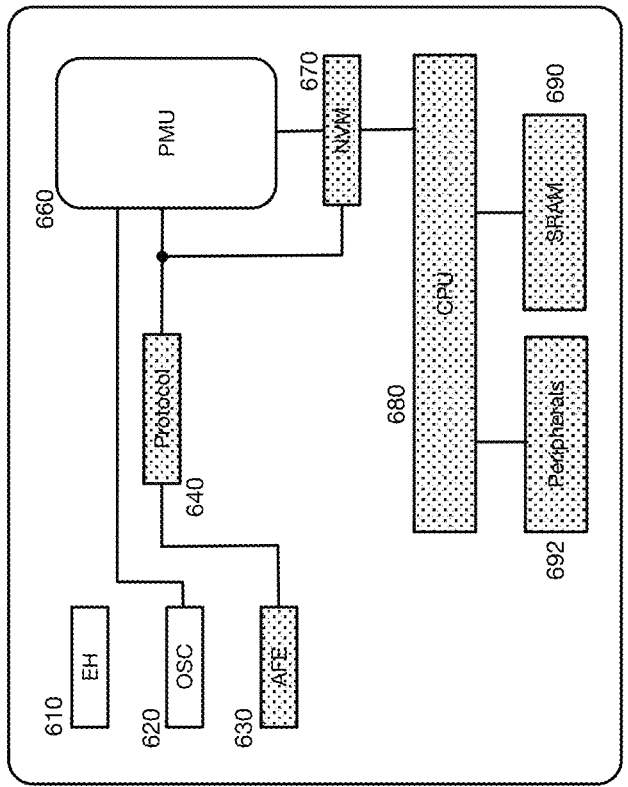

FIG. 6 is a block diagram illustrating example implementations 600 and 601 of a receiver device. In some circumstances, receiver devices (e.g., tag devices) may maintain power to all or a significant majority of circuitry and/or may wait until sufficient RF power and/or energy is available to perform a particular communication operation. In other circumstances, receiver devices may power down some processing circuitry (e.g., one or more processing units) and/or volatile memory components while receiving wireless signal packets. However, via one or more embodiments and/or implementations such as those examples described herein, power consumption may be further reduced by power gating, for example, particular circuitry at advantageous times.

For example, receiver device 600 and/or receiver device 601 depicted in FIG. 6 may include energy harvesting (EH) circuitry 610, oscillator 620, analog front end (AFE) circuitry 630, protocol implementation circuitry 640 (e.g., circuitry to implement substantial compatibility and/or substantial compliance with a particular protocol or standard, such as a gen2-type protocol), power management unit 660, non-volatile memory 670, processing unit 680, synchronous random access memory (SRAM) 690 and/or peripheral circuitry 692. Of course, these are merely example circuit types that may be implemented in a receiver device, and embodiments and/or implementations are not limited in scope to the particular examples provided. In an implementation, the various circuits and/or functional units may be implemented as a battery-less leaf node SoC, for example. For example, in particular implementations leaf node devices may perform lower-power sensing and/or may implement lighter-weight communication protocols (e.g., to communicate with edge devices of an edge device/server-type network). Also, in particular implementations, leaf node devices may be battery-less and/or may be deployed in large numbers. Of course, subject matter is not limited in scope in these respects.

In an implementation, example receiver device 600 may enter a reduced power state at least in part by power-gating and/or otherwise "turning off" substantially all circuitry with the exceptions of EH 610, OSC 620 and PMU 660. For example, EH 610, OSC 620 and PMU 660 may remain powered on in a lowered power state for receiver device 600 so that PMU 660 may be signaled at appropriate times (e.g., see FIGS. 4 and 5 and associated discussion above) to transition receiver device 600 to a higher power state, such as by powering up AFE 630 and protocol implementation circuitry 640. NVM 670 may also be powered up as part of a higher power state for receiver device 600, for example. For example receiver device 600, circuitry to be powered down while receiver device 600 is in a lower-power state for a particular implementation are depicted in FIG. 6 as shaded. In an implementation, AFE 630 and/or protocol implementation circuitry 640 may process (e.g., detect, demodulate and/or decode) signals and/or signal packets received at an antenna (not shown) while receiver device 600 is in a higher power state. In an implementation, CPU 680, SRAM 690 and/or peripherals circuitry 692 may also be powered up while receiver device 600 is in an elevated power state.

In another implementation, example receiver device 601 may further incorporate an autocorrelator circuit (ACORR) 650. For a lower-power state for receiver device 601, EH 610, OSC 620, PMU 660, AFE 630 and/or ACORR 650 may remain powered-on, while other circuits are power-gated and/or otherwise turned off (e.g., see circuitry depicted as shaded in FIG. 6). For a higher power state, protocol implementation circuitry 640 and NVM 670 may be powered-on to, at least in part, process (e.g., detect, demodulate and/or decode) received signals and/or signal packets. Example functionality of ACORR 650 is described more fully below. For particular implementations, example receiver device 600 may consume less power and/or may harvest and/or conserve more power than example receiver device 601. However, receiver device 601 may provide improved throughput as compared with receiver device 600, as explained more fully below. In general, particular implementations may be directed at reducing power and/or energy consumption and/or improving power and/or energy harvesting and/or conservation at the cost of reduced throughput due at least in part to repeated transmission of iterations of particular wireless signal packets. Benefits and/or advantages to be realized may include more robust and/or reliable operation for IoT devices, for example, that may operate in environments with fluctuating and/or less reliable RF power and/or energy availability.

Figure 7:
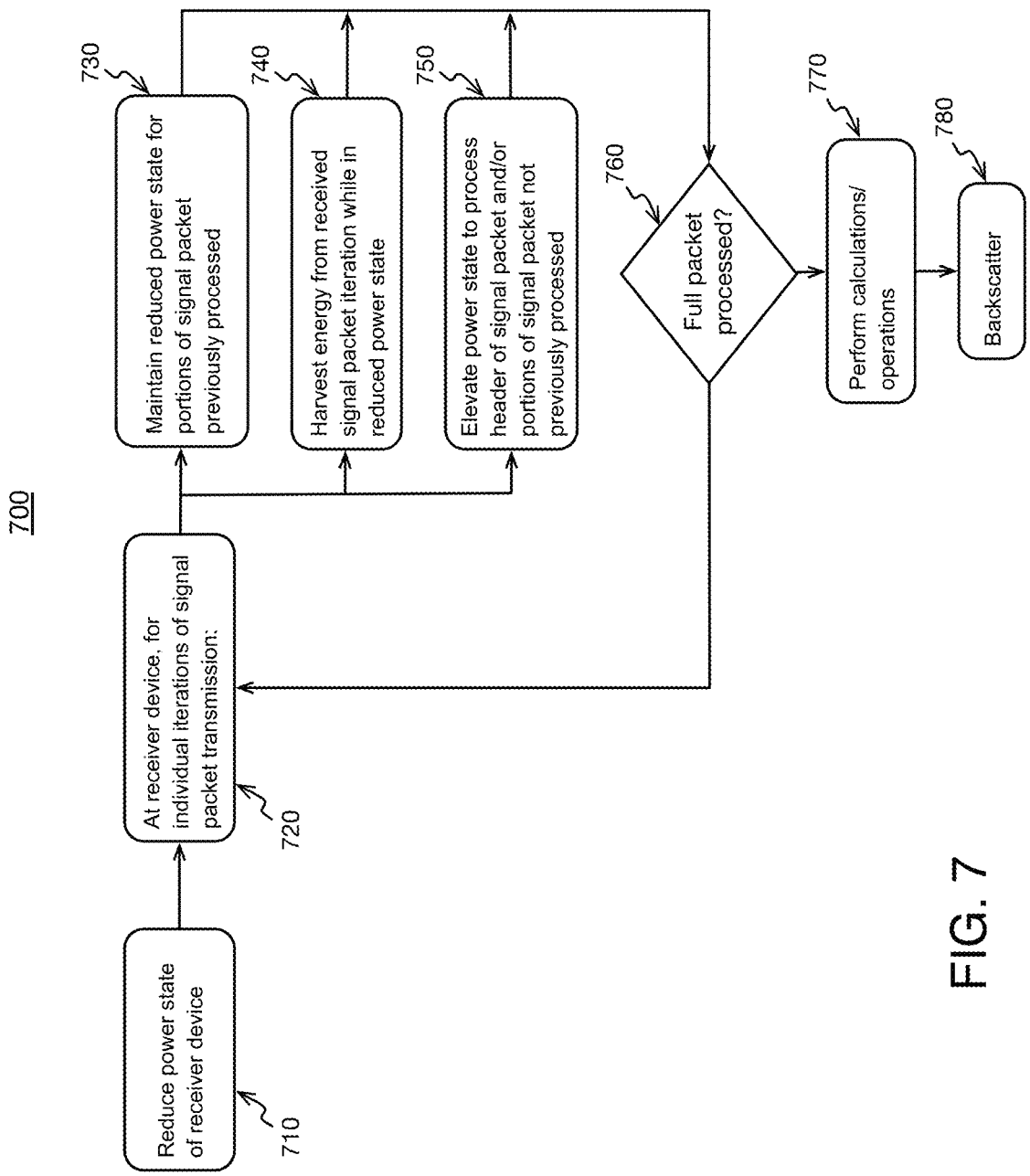
FIG. 7 is a flow diagram of a process for processing multiple iterations of a wireless signal packet at a receiver device, in accordance with an implementation.

FIG. 7 is a flow diagram of an embodiment 700 of a process for processing multiple iterations of a wireless signal packet (e.g., complete and/or unfragmented wireless signal packet) at a receiver device. In a particular implementation, process 700 may expand on example process 400 and may include operations performed in conjunction with example receiver devices 600 and/or 601. It should be noted that content acquired or produced, such as, for example, input signals, output signals, operations, results, etc. associated with example process 700 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

As depicted at block 710, a power state for a receiver device, such as receiver device 600 and/or receiver device 601, may be reduced. For example, a reduced power state for receiver device 600 may include power-gating AFE 630, protocol implementation circuitry 640, NVM 670, CPU 680, SRAM 690 and/or peripherals circuitry 692. Also, for example, a reduced power state for receiver device 600 may include maintaining power to EH 610, OSC 620 and PMU 660. In another implementation, a reduced power state for receiver device 601 may include power-gating protocol implementation circuitry 640, NVM 670, CPU 680, SRAM 690 and/or peripherals circuitry 692, for example. A reduced power state for receiver device 601 may further include maintaining power to EH 610, OSC 620, AFE 630, ACORR 650 and/or PMU 660, in an implementation.

In an implementation, as depicted at blocks 720 and/or 760, individual iterations of a repeatedly-transmitted wireless signal packet, such as wireless signal packet 310, may be processed according to blocks 730, 740 and/or 750 until a full wireless signal packet has been processed. In an implementation, operations depicted at blocks 730, 740 and/or 750 may be performed substantially concurrently, substantially serially or any combination thereof. For example, for individual iterations of a repeatedly-transmitted particular wireless signal packet, one or more of blocks 730, 740 and/or 750 may be performed. Further, for example, operation of one or more of blocks 730, 740 and/or 750 may be performed in any order.

For example, for individual iterations of a repeatedly-transmitted particular wireless signal packet, a receiver device, such as receiver device 600 and/or receiver device 601, may maintain and/or enter a reduced power state for portions of the particular wireless signal packet that have been previously received and/or processed, as depicted at block 730. Also, for individual iterations of a repeatedly-transmitted particular wireless signal packet, a receiver device, such as receiver device 600 and/or receiver device 601, may harvest power and/or energy from received iterations of a wireless signal packet while in a lower power state as depicted at block 740, for example.

Further, for individual iterations of a repeatedly-transmitted particular wireless signal packet, a receiver device, such as receiver device 600 and/or receiver device 601, may elevate a power state of the receiver device to process (e.g., detect, demodulate and/or decode) a header of a particular wireless signal packet and/or to process portions of a particular wireless signal packet not previously processed as depicted at block 750, in a particular implementation. For example, an elevated/higher power state for receiver device 600 may include powering up or otherwise turning on AFE 630, protocol implementation circuitry 640, NVM 670, CPU 680, SRAM 690 and/or peripherals circuitry 692. An elevated/higher power state for receiver device 600 may also include maintenance of power to EH 610, OSC 620 and PMU 660, for example. In another implementation, an enhanced/higher power state for receiver device 601 may include powering-up or otherwise turning on protocol implementation circuitry 640, NVM 670, CPU 680, SRAM 690 and/or peripherals circuitry 692, for example. An elevated/higher power state for receiver device 601 may further include maintaining power to EH 610, OSC 620, AFE 630, ACORR 650 and/or PMU 660, in an implementation.

In an implementation, receiving circuitry, such as AFE 630, protocol implementation circuitry 640, NVM 670, CPU 680, SRAM 690 and/or peripherals circuitry 692, for example, may power up over a period of time (e.g., rather than instantly). Further, for particular implementations, receiving circuitry may be powered up just prior to a receiving device encountering a portion of the wireless signal packet that has not yet been processed, as discussed previously and as discussed more fully below (see, for example, FIGS. 8-9). An amount of time to power-up receiving circuitry may be taken into account when enabling the receiving circuitry prior to encountering a portion of the wireless signal packet that has not yet been processed, for example.

As mentioned, in an implementation, at block 760 a determination may be made as to whether a full wireless signal packet has been processed. For situations in which a full particular wireless signal packet has not been processed (e.g., a complete particular wireless signal packet cannot be reconstructed), one or more additional iterations may be processed as indicated at block 720, for example. Further, in an implementation, for situations in which a full particular wireless signal packet has been processed, one or more calculations and/or other operations may be performed as indicated at block 770. Further, a back-scatter operation may be performed as indicated at block 780, in an implementation. For example, a back-scatter operation, such as indicated at block 780, may include communication of an acknowledgement of a successful communication of a particular wireless signal packet and/or may include communication of other content (e.g., sensor content, computational results, etc.) between a receiver device, such as receiver device 600 and/or 601, and a transmitter device, such as reader device 102, for example.

For operations depicted at blocks 730 and/or 750, for example, various techniques may be utilized to determine when to reduce a power state of a receiver device and/or to elevate a power state of a receiver device. For example, transmission of various iterations of particular wireless signal packets may occur at predefined points in time. In an implementation, a receiver device, such as receiver device 600 and/or 601, may include one or more timer and/or counter circuits, for example, to track when to look for a header (H) of particular iterations of a particular wireless signal packet including elevating a power state of a receiver device. Timer and/or counter circuits may also determine, at least in part, when to reduce a power state of a receiver device and/or to renter an elevated power state based at least in part on when header (H) was received and/or based on previously-processed portions of the particular wireless signal packet.

For other implementations, determining when to reduce a power state of a receiver device and/or to elevate a power state of a receiver device may be based at least in part on a count of processed (e.g., detected, demodulated and/or decoded) bits of a particular wireless signal packet to elevate a power state of a receiver device, such as receiver device 600 and/or 601, to process additional portions of the particular wireless signal packet. Such an implementation may eliminate and/or reduce a need for processing a header of a particular wireless signal packet for individual iterations of the wireless signal packet.

In another implementation, specified sequences of bits within wireless signal packets may indicate positions within the wireless signal packet where specified bits or code sequences, for example, may be embedded. Such sequences of bits may be implemented in conjunction with techniques for counting bits, as mentioned above, to eliminate or reduce a need to process a header for individual iterations of a particular wireless signal packet. In a further implementation, code sequences having specified correlation properties may by embedded in wireless signal packets to allow a receiver device, such as receiver device 601 having an autocorrelator circuit 650, for example, to track and/or monitor progress of wireless signal packet reception, as explained more fully below.

Figure 8:
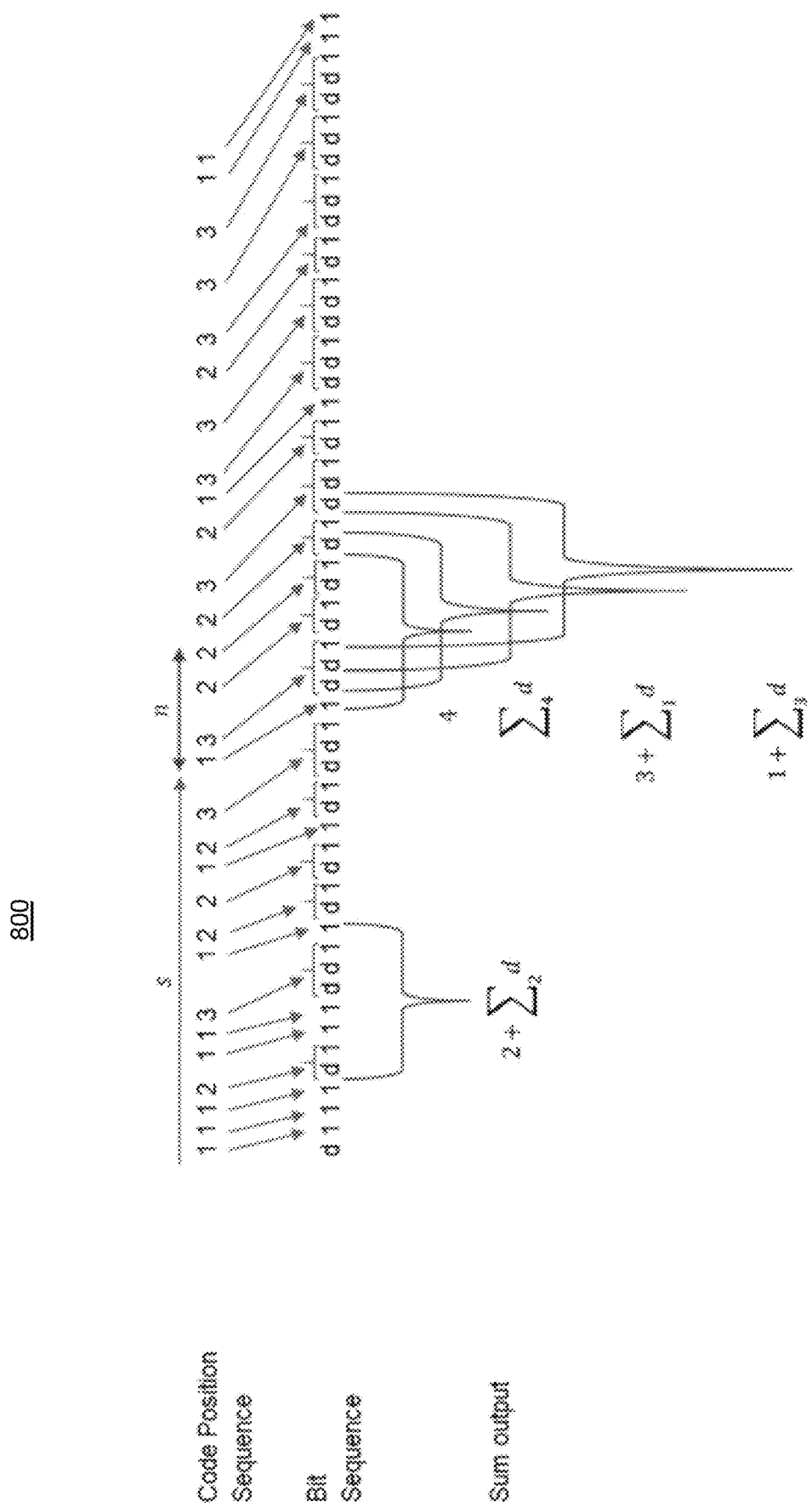
FIG. 8 is a diagram illustrating an example code position sequence for a wireless signal packet, in accordance with an implementation.

FIG. 8 is a diagram illustrating an example code position sequence 800 for a wireless signal packet, in accordance with an implementation. For example, code position sequence 800 may comprise a pre-agreed and/or otherwise specified positional code sequence that may select taps of an n-bit adder, in an implementation. In an implementation, depending at least in part on previous-processed bits of a particular signal packet, a receiver device, such as receiver device 601, may pipe a next n-position bits to the n-bit adder. In an implementation, for large n, a summation may be maximized responsive to a specified location within the code sequence being reached, for example. In an implementation, a trivial case of all "1" bits in a code sequence, a signal packet may be processed in accordance with a Manchester-type pre-encoding and/or the like, for example.

Figure 9:
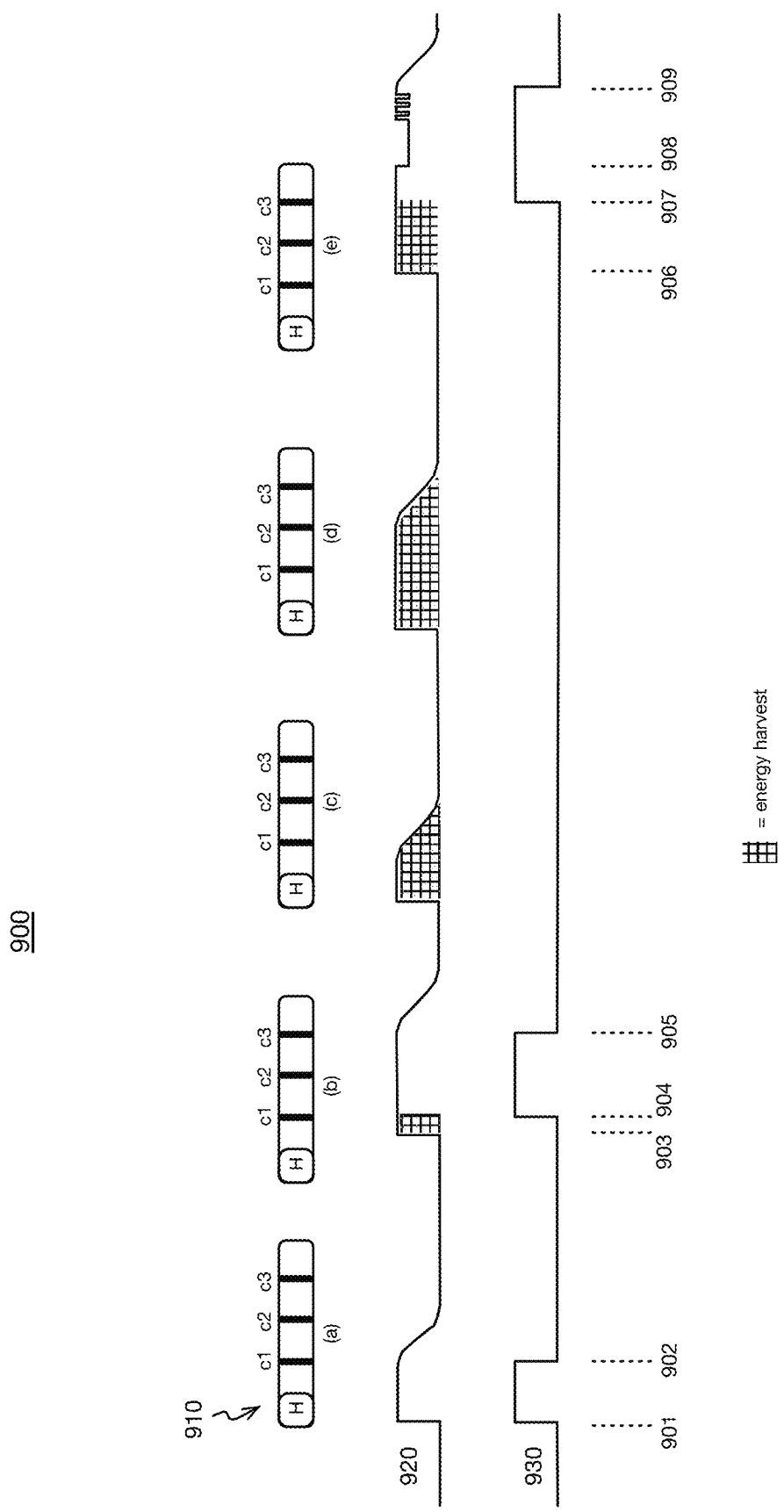
FIG. 9 is a diagram illustrating a process for processing multiple iterations of a wireless signal packet at a receiver device, in accordance with an implementation.

FIG. 9 is a diagram illustrating an example 900 for processing multiple iterations of a wireless signal packet at a receiver device, such as receiver device 601, in accordance with an implementation. Example 900 depicts multiple iterations of a particular wireless signal packet 910, including embedded correlation codes $c_1$, $c_2$, $c_3$. Of course, implementations and/or embodiments are not limited in scope in these respects. For example, although only three correlation codes $c_1$, $c_2$ and $c_3$ are depicted, implementations may include any number of correlation codes embedded within signal packets. For the example depicted in FIG. 9, waveform 920 depicts an RF power and/or energy signal measured a receiver device, such as receiver device 601. Further, for example, waveform 930 illustrates lower and higher power states for the receiver device.

At point in time 901, a receiver device, such as receiver device 601, may enter a higher power state and/or may process portions of particular wireless signal packet 910 up until correlation code $c_1$ is detected, such as via ACORR 650 of receiver device 601, for example. In an implementation, at least in part due to a brown-out condition seen at point in time 902, for subsequent iterations of particular wireless signal packet 910 a receiver device, such as receiver device 601, may transition from a lower power state to a higher power state at least in part responsive to a subsequence detection of correlation code $c_1$ in order to process additional portions of particular wireless signal packet 910. For example, during iteration (b) of particular wireless signal packet 910, correlation code $c_1$ may be detected at point in time 904. In an implementation, between points in time 904 and 905, a receiver device, such as receiver device 601, may enter a higher power state and/or may process additional portions of particular wireless signal packet 910, wherein the additional portions may be defined at least in part based on correlation codes $c_2$ and $c_3$, for example. Due at least in part to a brown-out condition following point in time 905 may prevent processing of further additional portions of wireless signal packet 910. However, as indicated at iteration (e), for example, a subsequent detection of correlation code c3 may prompt a receiver device, such as receiver device 601, to enter a higher power state to process remaining portions of particular wireless signal packet 910, in an implementation. Note that for periods of time when the reader device is not actively processing portions of particular wireless signal packet 910 to have not been previously processed (e.g., as indicated at least in part via correlation codes), the receiver device may be maintained at a reduced/lower power state so as to conserve and/or harvest power and/or energy, for example. For example 900, example energy-harvesting periods are marked via points in time 903-904 during iteration (b) and points in time 906-907 during iteration (e). Further energy-harvesting periods are depicted during iterations (c) and (d), for example.

In an implementation, utilization of correlation codes, for example, to identify particular locations within a particular wireless signal packet, such as wireless signal packet 910, may result in more efficient communication of wireless signal packets. For example, as compared with example 500 discussed above which does not include use of correlator circuitry, a transmission of a particular wireless signal packet may be completed relatively more quickly using correlation codes and/or other position identifiers embedded within a wireless signal packet at least in part as a result of not having to rely on timely reception of a header for individual iterations of a particular wireless signal packet, in an implementation.

In particular implementations, an addition of correlation codes and/or the like to wireless signal packets may result in an increased size of signal packets. Smaller numbers of "n," for example, may lead to false positives in position-determination operations.

Figure 10:
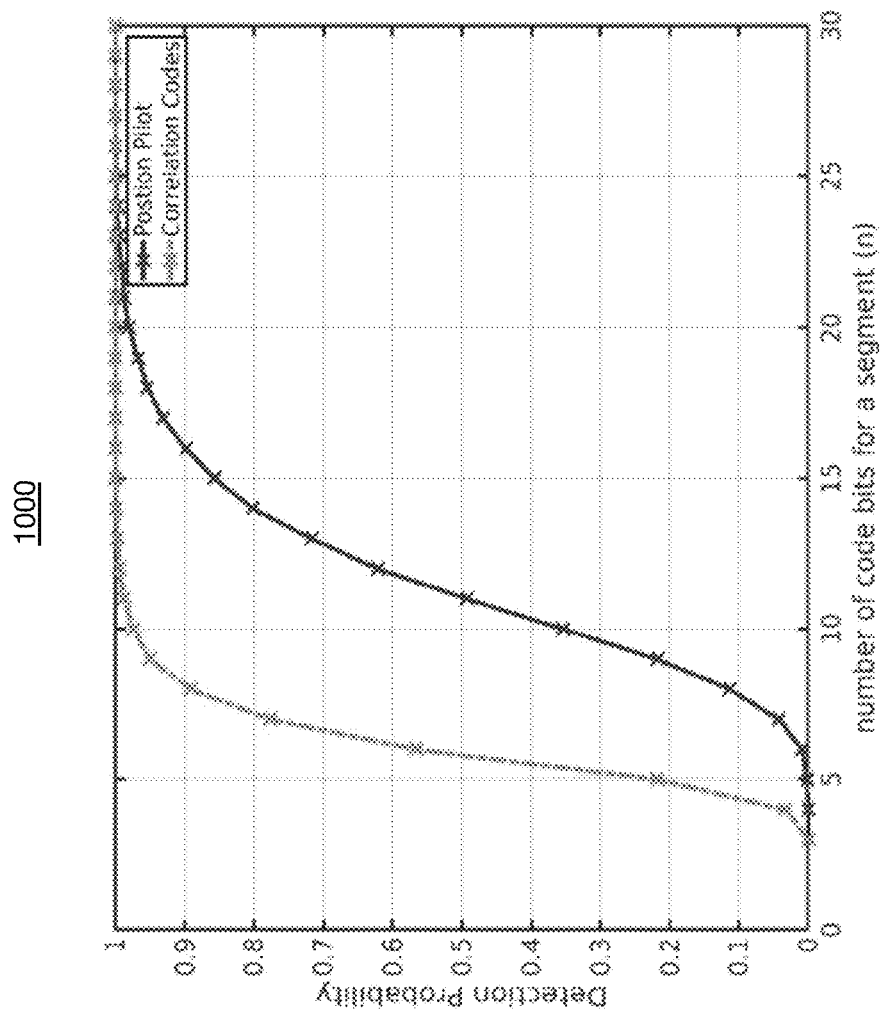
FIG. 10 depicts an example computed plot comparing correlation codes vs. probability of correct detection, in accordance with an implementation.

FIG. 10 depicts an example plot illustrating a theoretical analysis comparing positional and/or correlation codes for length of embedded sequence "n" vs. the probability of correct detection, for one or more implementations.

For embodiments and/or implementations, advantages may include, for example and not by way of limitation, substantial compliance with and/or substantial compatibility with existing protocols, thereby suggesting relatively small and/or negligible changes to transmitter/reader device infrastructure. Further, implementations and/or embodiments may be advantageously utilized in conjunction with various reader device/transponder device scenarios, including, but not limited to, those scenarios mentioned above in connection with FIG. 1A and FIG. 1B, for example. For example, implementations may be advantageously employed in situations including remote power, remote carrier and remote communication, local wireless power, remote carrier and remote communication, and/or local wireless power, local carrier and remote communication.

Embodiments may include receiving, at a receiver device, a plurality of iterations of a particular wireless signal packet repeatedly transmitted from a transmitter device, lowering a power state of the receiver device while receiving portions of the particular wireless signal packet that have already been processed at the receiver device, and reconstructing the particular wireless signal packet from processed portions obtained from the received iterations of the particular wireless signal packet. Embodiments may also include processing, at the receiver device, portions of the particular wireless signal packet, wherein the processing includes detecting, demodulating and/or decoding the portions of the particular wireless signal packet.

In an implementation, receiving a plurality of iterations of the particular wireless signal packet may include, for at least a first iteration of the plurality of iterations, receiving a header of the particular wireless signal packet. Further, in an implementation, receiving a plurality of iterations of a particular wireless signal packet may include, for at least a second iteration of a plurality of iterations and following a lowering of a power state of a receiver device to receive one or more portions of a particular wireless signal packet that have already been processed at a receiver device, elevating a power state of a receiver device responsive at least in part to receiving a header. In an implementation, elevating a power state of a receiver device responsive at least in part to receiving a header may include elevating a power state a determined period of time following reception of header based at least in part on one or more portions of the particular wireless signal packet that have already been processed at receiver device.

Additionally, in an implementation, receiving a plurality of iterations of a particular wireless signal packet may include, for at least a second iteration of a plurality of iterations and following lowering a power state of a receiver device to receive one or more of the portions of the particular wireless signal packet that have already been processed at a receiver device, elevating a power state of a receiver device responsive at least in part to identifying particular location identifier content within a particular wireless signal packet. Further, elevating a power state of a receiver device responsive at least in part to identifying particular location identifier content within a particular wireless signal packet may include elevating a power state responsive at least in part to identifying one or more specified code sequences embedded within a particular wireless signal packet. In an implementation, elevating a power state of a receiver device responsive at least in part to identifying particular location identifier content within a particular wireless signal packet may include elevating a power state responsive at least in part to monitoring reception of portions of a particular wireless signal packet via tracking one or more code sequences having specified correlation properties embedded within a particular wireless signal packet.

In an implementation, lowering a power state of a receiver device may include power-gating at least a non-volatile memory of the receiver device. Additionally, lowering a power state of a receiver device may further include providing power to at least an analog front end of a receiver device and an oscillator of a receiver device, for example. In an implementation, an example process may further include a receiver device acknowledging receipt of a particular wireless signal packet via backscatter.

It should be noted that the various circuits disclosed herein may be described using computer aided design tools and expressed (or represented), as data and/or instructions embodied in various machine-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, RFID reader devices, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2 G, 3 G, 4 G, or 5 G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 11:
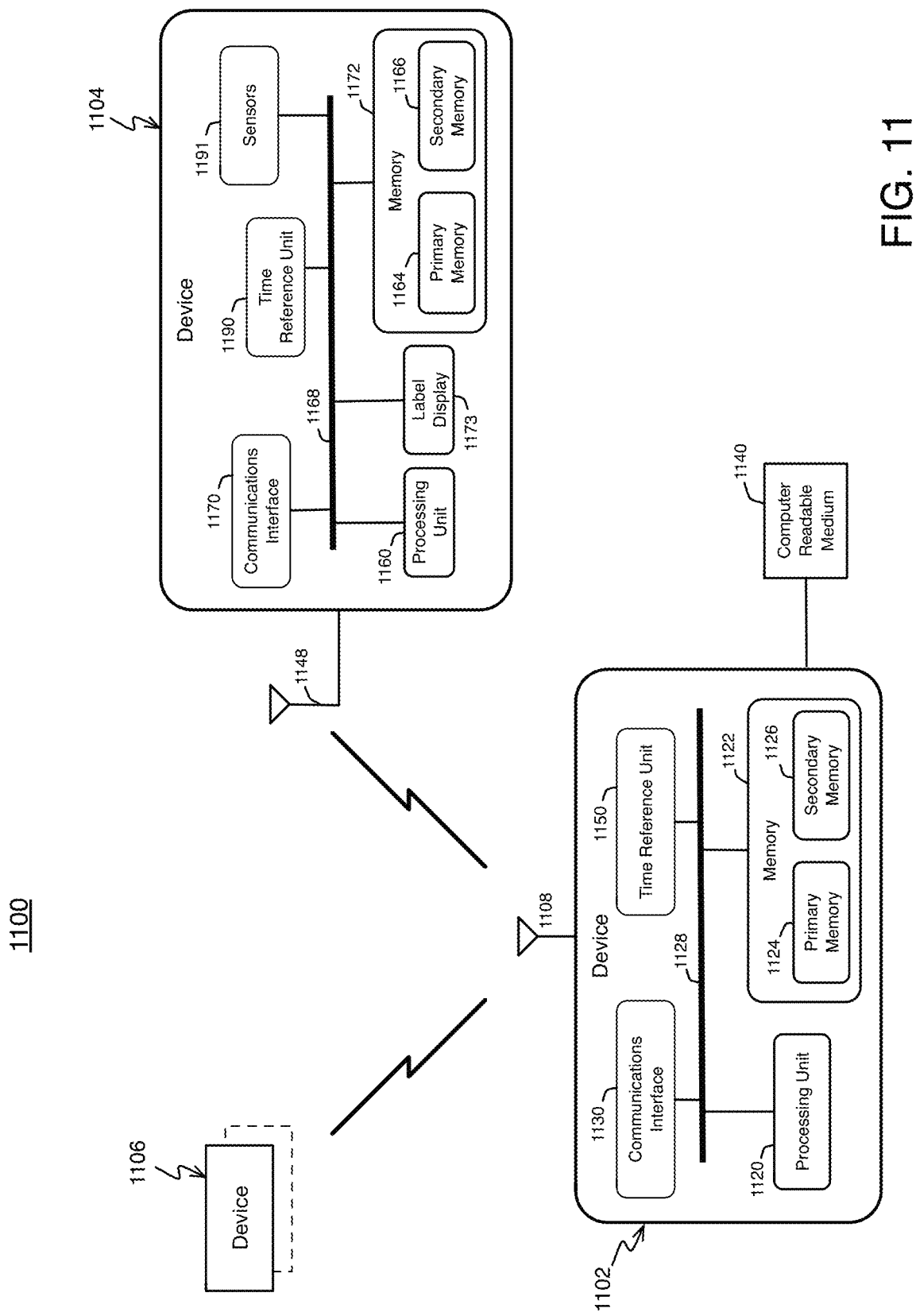
FIG. 11 is a schematic block diagram of an example computing system in accordance with an implementation.

In example embodiments, as shown in FIG. 11, a system embodiment may comprise a local network (e.g., device 1102 and medium 1140) and/or another type of network, such as a computing and/or communications network. For purposes of illustration, therefore, FIG. 11 shows an embodiment 1100 of a system that may be employed to implement either type or both types of networks. A network may comprise one or more network connections, links, processes, services, applications, and/or resources to facilitate and/or support communications, such as an exchange of communication signals, for example, between a computing device, such as device 1102, and another computing device, such as 1104, which may, for example, comprise one or more client computing devices and/or one or more server computing device.

Example devices in FIG. 11 may comprise features, for example, of a computing devices to implement a reader device (e.g., reader device 102, FIG. 1A) and/or a transponder device (e.g., transponder device 104, FIG. 1A), in an embodiment. It is further noted that the term computing device, in general, whether employed as a client and/or as a server, or otherwise, refers at least to a processor and a memory connected by a communication bus. A "processor" or "processing unit," for example, is understood to connote a specific structure such as a central processing unit (CPU) of a computing device which may include a control unit and an execution unit. In an aspect, a processor may comprise a device that interprets and executes instructions to process input signals to provide output signals. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device," "processor" and/or similar terms; however, if it is determined, for some reason not immediately apparent, that the foregoing understanding cannot stand and that 35 USC § 112 (f), therefore, necessarily is implicated by the use of the term "computing device," "processor" and/or similar terms, then, it is intended, pursuant to that statutory section, that corresponding structure, material and/or acts for performing one or more functions be understood and be interpreted to be described at least in FIGS. 1A-1B, 2A,-2B and 3-10, and in the text associated with the foregoing FIGS. 1A-1B, 2A,-2B and 3-10 of the present patent application.

FIG. 11 is a schematic diagram illustrating an example system 1100 that may include one or more devices configurable to implement techniques or processes described above, for example, in connection with FIGS. 1A-1B, 2A-2B and 3-10. System 1100 may include, for example, a first device 1102, a second device 1104, and a third device 1106, which may be operatively coupled together through a wireless communications techniques described above.

First device 1102, second device 1104 and third device 1106, as shown in FIG. 11, may be representative of any device, appliance or machine that may be configurable to exchange signals and/or messages over a wireless communications network. By way of example but not limitation, any of first device 1102, second device 1104, or third device 1106 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/ system, a wireless communication service provider/system; or any combination thereof. Any of the first, second, and third devices 1102, 1104, and 1106, respectively, may comprise one or more of a reader device or a transponder device in accordance with the examples described herein.

Similarly, a wireless communications network, as shown in FIG. 11, may be representative of one or more communication links, processes, or resources configurable to support the exchange of signals and/or messages between at least two of first device 1102, second device 1104, and third device 1106. By way of example but not limitation, a wireless communications network may include wireless or wired communication links, telephone or telecommunications systems, data buses or channels, optical fibers, terrestrial or space vehicle resources, local area networks, wide area networks, intranets, the Internet, routers or switches, and the like, or any combination thereof. In an embodiment, wireless communication links in a wireless communication link may enable one or more signal messaging formats set forth in one or more ISO/IEC 18000 conventions.

It is recognized that all or part of the various devices and networks shown in FIG. 11, and the processes and methods as further described herein, may be implemented using or otherwise including hardware, firmware, software, or any combination thereof.

Thus, by way of example but not limitation, first device 1102 may include at least one processing unit 1120 that is operatively coupled to a memory 1122 through a bus 1128. Likewise, second device 1104 may include at least one processing unit 1160 that is operatively coupled to a memory 1172 through a bus 1168.

Processing unit 1120 and/or processing unit 1160 may be representative of one or more circuits configurable to perform at least a portion of a computing procedure or process. By way of example but not limitation, processing unit 1120 and/or processing unit 1160 may include one or more processors, controllers, microprocessors, microcontrollers, application specific integrated circuits, digital signal processors, programmable logic devices, field programmable gate arrays, and the like, or any combination thereof.

Memory 1122 and/or memory 1172 may be representative of any mechanism for use in storing executable instructions, input/output values, parameters, measurements and/or symbols, etc. Memory 1122 may include, for example, a primary memory 1124 or a secondary memory 1126. Likewise, memory 1172 may include, for example, a primary memory 1164 or a secondary memory 1166. Primary memory 1124 and/or 1164 may include, for example, a random access memory, read only memory, non-volatile memory, etc. While illustrated in this example as being separate from processing unit 1120, it should be understood that all or part of primary memory 1124 may be provided within or otherwise co-located/coupled with processing unit 1120. Likewise, it should be understood that all or part of primary memory 1164 may be provided within or otherwise co-located/coupled with processing unit 1160. In a particular implementation, memory 1122 and processing unit 1120, and/or memory 1172 and processing unit 1160 may be configured to execute one or more aspects of process discussed above in connection with FIGS. 1A-1B, 2A-2B and 3-10.

Secondary memory 1126 and/or 1166 may include, for example, the same or similar type of memory as primary memory or one or more storage devices or systems, such as, for example, a disk drive, an optical disc drive, a tape drive, a solid state memory drive, etc. In certain implementations, secondary memory 1126 may be operatively receptive of, or otherwise configurable to couple to, a computer-readable medium 1140. Computer-readable medium 1140 may include, for example, any non-transitory medium that can carry or make accessible data, code or instructions for one or more of the devices in system 1100. Computer-readable medium 1140 may also be referred to as a storage medium.

First device 1102 may include a communication interface 1130 and second device 1104 may include a communication interface 1170 that provide for or otherwise supports an operative coupling of first device 1102 and second device 1104 at least through antennas 1108 and 1148. By way of example but not limitation, communication interface 1130 and/or 1170 may include a network interface device or card, a modem, a router, a switch, a transceiver, and the like. In other alternative implementations, communication interface 1130 and/or 1170 may comprise a wired/LAN interface, wireless LAN interface (e.g., IEEE std. 802.11 wireless interface) and/or a wide area network (WAN) air interface. In a particular implementation, communication interface 1130 and/or 1170 may include circuitry to enable an exchange of messages according to one or more signal messaging formats set forth in one or more ISO/IEC 18000 conventions. In a particular implementation, antenna 1108 in combination with communication interface 1130, and antenna 1148 in combination with communication interface 1170 may be used to implement transmission and reception of signals as illustrated in FIGS. 1A-1B, 2A-2B and 3-10.

According to an embodiment, second device 1104 may further comprise sensors 1191 which may comprise, for example, a light sensor and/or temperature sensor (e.g., embedded in a smart food label) capable of generating signals representative of measurements and/or observations of particular conditions. In addition, second device 1104 may comprise display label 1173 to display values computed at processing unit 1160. Display label 1173 may comprise, for example, via printed e-ink display. Such values displayed on and/or through display label 1173 may comprise values computed at processing unit 1160 based, at least in part, on signals representative of measurements and/or observations obtained from sensors 1191. Second device 1104 may also comprise circuitry and/or structures (not shown) for collecting and/or harvesting energy and/or power from a signal received at antenna 1148 (e.g., RF signal 110) such as, for example, charge pumps employing Dickson and/or cross-coupled doublers as described in "Power Supply Generation in CMOS Passive UHF RFID Tags," Alessio Facen and Andrea Boni, 2006 Ph.D. Research in Microelectronics and Electronics, IEEE Xplore, 11 Sep. 2006 and/or described in "Self-Biased Differential Rectifier With Enhanced Dynamic Range for Wireless Powering," Mahmoud H. Ouda, Waleed Khalil and Khaled N. Salama, IEEE Transactions on Circuits and Systems II: Express Briefs, Vol. 64, No. 5, May 2017, for example. As pointed out above, such energy collected and/or harvested from a signal received at antenna 1148 may be used for powering subsystems of second device 1104. Such subsystems of second device 1104 may include, for example, communication interface 1170, time reference unit 1190, sensors 1191, processing unit 1160, label display 1173 and/or memory 1172. It should be understood, however, that these are merely examples of subsystems of a device that may be powered based, at least in part, from energy harvested and/or collected from an RF signal received at an antenna, and claimed subject matter is not limited in this respect.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 11, first device 1102 and/or second device 1104 may provide one or more sources of executable computer instructions in the form physical states and/or signals (e.g., stored in memory states), for example. First device 1102 may communicate with second device 1104 by way of a network connection, such as by uplink and downlink signals (e.g., uplink signal 122 and downlink signal 124, FIG. 1A), for example. As previously mentioned, a connection, while physical, may not necessarily be tangible. Although first and second devices 1102 and 1104 of FIG. 11 show various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1122 and/or 1172 may comprise any non-transitory storage mechanism. Memory 1122/1172 may comprise, for example, primary memory 1124/1164 and secondary memory 1126/1166, additional memory circuits, mechanisms, or combinations thereof may be used. Memory 1122 and/or memory 1172 may comprise, for example, random access memory, non-volatile memory, read only memory, etc., such as in the form of one or more storage devices and/or systems, such as, for example, a disk drive including an optical disc drive, a tape drive, a solid-state memory drive, etc., just to name a few examples.

Memory 1122 and/or 1172 may be utilized to store a program of executable computer instructions. For example, processor 1120 and/or processor 1160 may fetch executable instructions from memory and proceed to execute the fetched instructions. Memory 1122 may also comprise a memory controller for accessing device readable-medium 1140 that may carry and/or make accessible digital content, which may include code, and/or instructions, for example, executable by processor 1120 and/or some other device, such as a controller, as one example, capable of executing computer instructions, for example. Under direction of processor 1120, a non-transitory memory, such as memory cells storing physical states (e.g., memory states), comprising, for example, a program of executable computer instructions, may be executed by processor 1120 and able to generate signals to be communicated via a network, for example, as previously described. Generated signals may also be stored in memory, also previously suggested.

Memory 1122 may store electronic files and/or electronic documents, such as relating to one or more users, and may also comprise a computer-readable medium that may carry and/or make accessible content, including code and/or instructions, for example, executable by processor 1120 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 11, processor 1120 and/or 1160 may comprise one or more circuits, such as digital circuits, to perform at least a portion of a computing procedure and/or process. By way of example, but not limitation, processor 1120 and/or 1160 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1120 and/or 1160 may perform signal processing, typically substantially in accordance with fetched executable computer instructions, such as to manipulate signals and/or states, to construct signals and/or states, etc., with signals and/or states generated in such a manner to be communicated and/or stored in memory, for example.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising:
   receiving, at a receiver device, a plurality of iterations of a particular wireless signal packet repeatedly transmitted from a transmitter device;
   lowering a power state of the receiver device while receiving one or more portions of the particular wireless signal packet that have already been processed at the receiver device;
   wherein the receiving the plurality of iterations of the particular wireless signal packet includes, for at least a second iteration of the plurality of iterations and following the lowering the power state of the receiver device, elevating the power state of the receiver device responsive at least in part to receiving a header of the particular wireless signal packet; and
   reconstructing the particular wireless signal packet from processed portions obtained from the received iterations of the particular wireless signal packet.

2. The method of claim 1, further comprising processing, at the receiver device, portions of the particular wireless signal packet, wherein the processing includes detecting, demodulating and/or decoding the portions of the particular wireless signal packet, and wherein the particular wireless signal packet is complete and/or unfragmented.

3. The method of claim 1, wherein the elevating the power state of the receiver device responsive at least in part to the receiving the header includes elevating the power state a determined period of time following reception of the header based at least in part on the received one or more portions of the particular wireless signal packet that have already been processed at the receiver device.

4. The method of claim 1, wherein the lowering the power state of the receiver device includes power-gating at least a non-volatile memory of the receiver device.

5. The method of claim 4, wherein the lowering the power state of the receiver device further includes providing power to at least an analog front end of the receiver device and an oscillator of the receiver device.

6. A method, comprising:
receiving, at a receiver device, a plurality of iterations of a particular wireless signal packet repeatedly transmitted from a transmitter device;
lowering a power state of the receiver device while receiving portions of the particular wireless signal packet that have already been processed at the receiver device;
wherein the receiving the plurality of iterations of the particular wireless signal packet includes, for at least a second iteration of the plurality of iterations and following the lowering the power state of the receiver device to receive one or more of the portions of the particular wireless signal packet that have already been processed at the receiver device, elevating the power state of the receiver device responsive at least in part to identifying particular location identifier content within the particular wireless signal packet; and
reconstructing the particular wireless signal packet from processed portions obtained from the received iterations of the particular wireless signal packet.

7. The method of claim 6, wherein the elevating the power state of the receiver device responsive at least in part to identifying particular location identifier content within the particular wireless signal packet includes elevating the power state responsive at least in part to identifying one or more specified code sequences embedded within the particular wireless signal packet.

8. The method of claim 6, wherein the elevating the power state of the receiver device responsive at least in part to identifying particular location identifier content within the particular wireless signal packet includes elevating the power state responsive at least in part to monitoring reception of the portions of the particular wireless signal packet via tracking one or more code sequences having specified correlation properties embedded within the particular wireless signal packet.

9. A receiver device, comprising:
an analog front end to receive a plurality of iterations of a particular wireless signal packet repeatedly transmitted from a transmitter device, wherein the particular wireless signal packet is complete and/or unfragmented;
a power management circuit to lower a power state of the receiver device during receipt by the analog front end of one or more portions of the particular wireless signal packet to have already been processed at the receiver device;
wherein, for at least a second iteration of the plurality of iterations of the particular wireless signal packet and following a lowering the power state of the receiver device by the power management circuit, the power management circuit to elevate the power state of the receiver device responsive at least in part to receipt by the analog front end of a header of the particular wireless signal packet; and
at least one processor to reconstruct the particular wireless signal packet from processed portions obtained from the received iterations of the particular wireless signal packet.

10. The receiver device of claim 9, further comprising protocol implementation circuitry, wherein the analog front end and/or the protocol implementation circuitry to process portions of the particular wireless signal packet, wherein, to process the portions of the particular wireless signal packet, the analog front end and/or the protocol implementation circuitry to detect, demodulate and/or decode the portions of the particular wireless signal packet.

11. The receiver device of claim 9, wherein, to elevate the power state of the receiver device responsive at least in part to the receipt of the header, the power management circuit to elevate the power state a determined period of time subsequent to reception of the header based at least in part on the received one or more portions of the particular wireless signal packet to have already been processed at the receiver device.

12. The receiver device of claim 9, wherein, to receive the plurality of iterations of the particular wireless signal packet, the power management circuit to, for at least a third iteration of the plurality of iterations and subsequent to the lowering of the power state of the receiver device by the power management circuit to receive one or more of the portions of the particular wireless signal packet to have already been processed at the receiver device, elevate the power state of the receiver device responsive at least in part to identification at the receiver device of particular location identifier content within the particular wireless signal packet.

13. The receiver device of claim 12, wherein, to elevate the power state of the receiver device responsive at least in part to the identification of the particular location identifier content within the particular wireless signal packet, the power management circuit to elevate the power state of the receiver device responsive at least in part to identification at the receiver device of one or more specified code sequences embedded within the particular wireless signal packet.

14. The receiver device of claim 12, wherein, to elevate the power state of the receiver device responsive at least in part to the identification of the particular location identifier content within the particular wireless signal packet, the power management circuit to elevate the power state of the receiver device responsive at least in part to correlation at the receiver device of one or more code sequences having specified correlation properties embedded within the particular wireless signal packet.

15. The receiver device of claim 9, wherein, to lower the power state of the receiver device, the power management circuit to power-gate at least a non-volatile memory of the receiver device.

16. The receiver device of claim 15, wherein, to lower the power state of the receiver device, the power management circuit further to provide power to at least the analog front end of the receiver device and to an oscillator of the receiver device.

* * * * *